US009311151B2

(12) United States Patent
He et al.

(10) Patent No.: US 9,311,151 B2
(45) Date of Patent: Apr. 12, 2016

(54) PORTABLE DEVICE AND TASK PROCESSING METHOD AND APPARATUS THEREFOR

(75) Inventors: Zhiqiang He, Beijing (CN); Ying Liang, Beijing (CN); Xingwen Chen, Beijing (CN); Zhongqing Li, Beijing (CN)

(73) Assignees: Beijing Lenovo Software Ltd. (CN); Lenovo (Beijing) Limited (CN)

( * ) Notice: Subject to any disclaimer, the term of this patent is extended or adjusted under 35 U.S.C. 154(b) by 506 days.

(21) Appl. No.: 13/512,519

(22) PCT Filed: Nov. 24, 2010

(86) PCT No.: PCT/CN2010/001886
§ 371 (c)(1),
(2), (4) Date: May 29, 2012

(87) PCT Pub. No.: WO2011/066715
PCT Pub. Date: Jun. 9, 2011

(65) Prior Publication Data
US 2012/0233622 A1    Sep. 13, 2012

(30) Foreign Application Priority Data

Dec. 1, 2009   (CN) .......................... 2009 1 0238689

(51) Int. Cl.
G06F 9/46         (2006.01)
G06F 9/50         (2006.01)

(52) U.S. Cl.
CPC ............ *G06F 9/5044* (2013.01); *G06F 9/5055* (2013.01)

(58) Field of Classification Search
None
See application file for complete search history.

(56) References Cited

U.S. PATENT DOCUMENTS 7,627,695 B2 * 12/2009 Peck et al. ................... 710/8
2006/0075224 A1 * 4/2006 Tao ............................. 713/164

FOREIGN PATENT DOCUMENTS

CN        1237462 C       1/2006
CN      100517295 C       7/2009
WO   WO-03/083694 A1    10/2003

OTHER PUBLICATIONS

"International Application Serial No. PCT/CN2010/001886, International Search Report mailed Mar. 3, 2011", 2 pgs.
"International Application Serial No. PCT/CN2010/001886, Written Opinion mailed Mar. 3, 2011", 4 pgs.

* cited by examiner

*Primary Examiner* — Gregory A Kessler
(74) *Attorney, Agent, or Firm* — Schwegman, Lundberg & Woessner, P.A.

(57) ABSTRACT

A portable device and a task processing method and apparatus for the portable device are provided. The method comprises the steps of: obtaining task requirement information of a user; determining, from a first system and a second system, an execution system for responding to a system task corresponding to the task requirement information based on a predetermined policy; and transmitting the task requirement information to the execution system such that the execution system can execute the system task based on the task requirement information. With the present invention, it is possible to automatically determine, based on the task requirement information, an execution system for executing a system task corresponding to the task requirement information, such that the user operation can be facilitated.

13 Claims, 9 Drawing Sheets

PORTABLE DEVICE AND TASK PROCESSING METHOD AND APPARATUS THEREFOR

This application is a National Phase application of, and claims priority to, PCT Application No. PCT/CN2010/001886, filed Nov. 24, 2010 which was published as WO 2011/066715 A1 on Jun. 9, 2011, entitled METHOD AND DEVICE FOR PROCESSING TASKS OF PORTABLE APPARATUS AND PORTABLE APPARATUS, which claimed priority to Chinese Application No. 200910238689.0, filed Dec. 1, 2009, which applications and publication are incorporated herein by reference in their entirety.

FIELD OF THE INVENTION

The invention relates to computer technology, and more particularly, to a portable device and a task processing method and apparatus for the portable device.

BACKGROUND OF THE INVENTION

Hybrid system, or hybrid PC, is a technology in which a further system is embedded into/integrated with an original PC system. For example, a system of a mobile terminal device can be embedded into/integrated with an original system of a notebook computer. In this way, two systems can cooperate with each other such that their respective advantages can be fully exploited.

FIG. 1 is a block diagram showing cooperation in an existing hybrid system. The hybrid system comprises a master system (such as Vista, Windows XP, Linux, etc.) and a slave system (such as Win CE, Linux, etc., also referred to as subsystem). The master and the slave systems cooperatively communicate with each other to fulfill the task requirements of a user. Each of the master and the slave systems has its own hardware and software modules. Also, there are some devices (such as LCD display, keyboard, network adapter, audio device, etc.) shared by both systems. For such shared devices, the task requirement of a user can be triggered by a requirement generation module and the instructions of such task requirement can be transmitted by the Embedded Controller (EC) of the master system or the Multimedia Control Unit (MCU) of the slave system to the corresponding system for accomplishing the task required by the user.

In an existing hybrid system, when a user initiates a task requirement to be accomplished by a particular system, it is required to switch between the master system and the slave system. Such switching operation is an inter-system switching directly performed by the user.

In this case, the user has to face the problem of multi-system operation. The user may be confused on how and when to switch between these two systems. Additionally, it is difficult for the user to effectively take advantages of different slave systems having different strengths. Currently, state switching of a hybrid system is complicated since there are many states and a safe and convenient switching between different states has to be taken into consideration.

What a user really cares is how to accomplish a desired application in a simply, efficient and optimum manner, rather than the hardware platform and operation system for accomplishing the application as well as the underlying complicated, boring and abstract technical expertise. For a hybrid system, a number of advantages come along with complicated states, troublesome operations as well as difficulty in deployment/management and confusion on usage custom due to dual-system. Thus, it is the key for converting the innovative hybrid system technology into products to facilitate user operations while exploiting advantages of the hybrid system.

In implementing the present invention, the inventor has recognized the following problems in the prior art. The existing hybrid system cannot accomplish a task requirement of a user by using a corresponding system automatically without the user selecting and switching to the system fulfilling the task requirement. However, the user typically is not familiar with the slave system in the hybrid system, which causes difficulty in operating the hybrid system.

SUMMARY OF THE INVENTION

The object of the present invention is to provide a portable device and a task processing method and apparatus for the portable device. According to the present invention, it is possible to automatically determine, based on the task requirement information, an execution system for executing a system task corresponding to the task requirement information. In this way, it is not necessary for the user to carry out inter-system switching and select the system for performing the system task, such that the user operation can be facilitated.

In order to achieve the above object, the embodiments of the present invention provide the following solutions.

In one aspect, a task processing method is provided, which is applied to a portable device comprising a first system and a second system, the first system comprising a first hardware system and a first operation system running on the first hardware system, the second system comprising a second hardware system and a second operation system running on the second hardware system, the method comprising the steps of:
  obtaining task requirement information of a user;
  determining, from the first system and the second system, an execution system for responding to a system task corresponding to the task requirement information based on a predetermined policy; and
  transmitting the task requirement information to the execution system such that the execution system can execute the system task based on the task requirement information.

Preferably, the step of obtaining task requirement information of a user comprising:
  obtaining the task requirement information of the user via a task input hardware equipment; or
  obtaining the task requirement information of the user via a task input application.

Preferably, the task input hardware equipment comprises a keyboard, a mouse and/or a remote controller; and the step of obtaining the task requirement information of the user via a task input application comprises:
  obtaining a task requirement input by the user in a task input interface and generating the task requirement information based on the input task requirement.

Preferably, the step of determining from the first system and the second system an execution system for responding to a system task corresponding to the task requirement information based on a predetermined policy comprises:
  selecting, based on a slave-system-first policy, a slave system from the first system and the second system, or, if the slave system is not capable of executing the system task, a master system from the first system and the second system, as the execution system for the system task corresponding to the task requirement information.

Preferably, the step of selecting based on a slave-system-first policy a slave system from the first system and the second system as the execution system for the system task corresponding to the task requirement information comprises:
  selecting, based on the slave-system-first policy, the slave system as the execution system for the system task corresponding to the task requirement information when both the master and the slave systems are in an active state;
  waking up the slave system and determining the slave system as the execution system for the system task corresponding to the task requirement information when the master system is in an active state, the slave system is in an inactive state and it is determined based on the slave-system-first policy that the slave system is required to execute the system task; and
  waking up the master system and determining the master system as the execution system for the system task corresponding to the task requirement information when the master system is in an inactive state, the slave system is in an active state and it is determined based on the slave-system-first policy that the master system is required to execute the system task.

Preferably, waking up the slave system further comprises: synchronizing the system task corresponding to the task requirement information from the master system to the slave system; and waking up the master system further comprises: synchronizing the system task corresponding to the task requirement information from the slave system to the master system.

Preferably, the method further comprises, after the slave system as the execution system for the system task corresponding to the task requirement information completing the execution of the system task: synchronizing to the master system device resource involved in execution of the system task by the slave system.

Preferably, the step of determining from the first system and the second system an execution system for responding to a system task corresponding to the task requirement information based on a predetermined policy comprises:
  determining, from the first system and the second system, a system capable of processing the system task corresponding to the task requirement information based on the task requirement information;
  determining, when the system capable of processing the system task corresponding to the task requirement information is in an active state, the system as the execution system for the system task corresponding to the task requirement information; or
  waking up, when the system capable of processing the system task corresponding to the task requirement information is in an inactive state, the system and determining the system as the execution system for the system task corresponding to the task requirement information.

Preferably, when there are at least two systems being in an active state and capable of processing the system task corresponding to the task requirement information, the system having lower power consumption and higher processing efficiency from the at least two systems is determined as the execution system for the system task corresponding to the task requirement information; or when there are at least two systems being woke up and capable of processing the system task corresponding to the task requirement information, the system having lower power consumption and higher processing efficiency from the at least two systems is determined as the execution system for the system task corresponding to the task requirement information.

In another aspect, a task processing apparatus is provided, which is applied to a portable device comprising a first system and a second system, the first system comprising a first hardware system and a first operation system running on the first hardware system, the second system comprising a second hardware system and a second operation system running on the second hardware system, the apparatus comprising:
  an obtaining unit for obtaining task requirement information of a user; and
  a scheduling management unit for determining, from the first system and the second system, an execution system for responding to a system task corresponding to the task requirement information based on a predetermined policy and transmitting the task requirement information to the execution system such that the execution system can execute the system task based on the task requirement information.

Preferably, the scheduling management unit comprises:
a first scheduling management subunit for selecting, based on a slave-system-first policy, the slave system from the first system and the second system as the execution system for the system task corresponding to the task requirement information when both the first and the second systems are in an active state;
a second scheduling management subunit for waking up the slave system and determining the slave system as the execution system for the system task corresponding to the task requirement information when a master system of the first system and the second system is in an active state, the slave system is in an inactive state and it is determined based on the slave-system-first policy that the slave system is required to execute the system task; and
a third scheduling management subunit for waking up the master system and determining the master system as the execution system for the system task corresponding to the task requirement information when the master system is in an inactive state, the slave system is in an active state and it is determined based on the slave-system-first policy that the master system is required to execute the system task;
wherein the first scheduling management subunit and the second scheduling management subunit are configured to select the master system as the execution system for the system task corresponding to the task requirement information if the slave system is not capable of executing the system task;
a fourth scheduling management subunit for determining, from the first system and the second system, a system capable of processing the system task corresponding to the task requirement information based on the task requirement information, determining, when the system capable of processing the system task corresponding to the task requirement information is in an active state, the system as the execution system for the system task corresponding to the task requirement information or waking up, when the system capable of processing the system task corresponding to the task requirement information is in an inactive state, the system and determining the system as the execution system for the system task corresponding to the task requirement information.

Preferably, the apparatus further comprises:
a first synchronization unit for synchronizing the system task corresponding to the task requirement information from the master system to the slave system while waking up the slave system; and a second synchronizing unit for synchronizing the system task corresponding to the task requirement information from the slave system to the master system while waking up the master system.

In a further aspect, a portable device is provided, which comprises:

a first system comprising a first hardware system and a first operation system running on the first hardware system;

a second system comprising a second hardware system and a second operation system running on the second hardware system;

wherein the portable device further comprises:

an obtaining unit for obtaining task requirement information of a user; and a scheduling management unit for determining, from the first system and the second system, an execution system for responding to a system task corresponding to the task requirement information based on a predetermined policy and transmitting the task requirement information to the execution system such that the execution system can execute the system task based on the task requirement information.

Preferably, the scheduling management unit comprises:

a first scheduling management subunit for selecting, based on a slave-system-first policy, the slave system from the first system and the second system as the execution system for the system task corresponding to the task requirement information when both the first and the second systems are in an active state;

a second scheduling management subunit for waking up the slave system and determining the slave system as the execution system for the system task corresponding to the task requirement information when a master system of the first system and the second system is in an active state, the slave system is in an inactive state and it is determined based on the slave-system-first policy that the slave system is required to execute the system task; and a third scheduling management subunit for waking up the master system and determining the master system as the execution system for the system task corresponding to the task requirement information when the master system is in an inactive state, the slave system is in an active state and it is determined based on the slave-system-first policy that the master system is required to execute the system task;

wherein the first scheduling management subunit and the second scheduling management subunit are configured to select the master system as the execution system for the system task corresponding to the task requirement information if the slave system is not capable of executing the system task;

a fourth scheduling management subunit for determining, from the first system and the second system, a system capable of processing the system task corresponding to the task requirement information based on the task requirement information, determining, when the system capable of processing the system task corresponding to the task requirement information is in an active state, the system as the execution system for the system task corresponding to the task requirement information or waking up, when the system capable of processing the system task corresponding to the task requirement information is in an inactive state, the system and determining the system as the execution system for the system task corresponding to the task requirement information.

Preferably, the obtaining unit and the scheduling management unit are provided in an Embedded Controller (EC) of the first hardware system or in a Micro Control Unit (MCU) of the second hardware system; or the obtaining unit and the scheduling management unit are provided in the first operation system or in the second operation system.

The embodiments of the present invention have the following advantageous effects. By obtaining the task requirement information of the user, it is possible to determine, based on the task requirement information, an execution system for executing a system task corresponding to the task requirement information. In this way, the user can focus on the requirement to be fulfilled, without considering the switching between the systems and the platform for executing the system task. Based on the task requirement, the system and resources for fulfilling the user requirement can be automatically determined. The user operation can be changed from system-oriented into application-oriented, such that the user operation can be facilitated and the user experience can be significantly improved.

DETAILED DESCRIPTION OF PREFERRED EMBODIMENTS

In the following, the present invention will be described in detail with reference to the embodiments and figures, such that the problem to be solved, the solutions and the advantages of the present invention will be more apparent.

The existing hybrid system requires a user to select and switch to a system for executing a system task corresponding to task requirement information. However, the user typically is not familiar with the slave system in the hybrid system, which causes difficulty in operating the hybrid system. In view of this problem, the present invention provides a portable device and a task processing method and apparatus for the portable device, capable of automatically determine a system fulfilling the task requirement of the user. In this way, it is not necessary for the user to select and switch to the system, such that the user operation can be changed from system-oriented into application-oriented and thus be facilitated.

Figure 1:
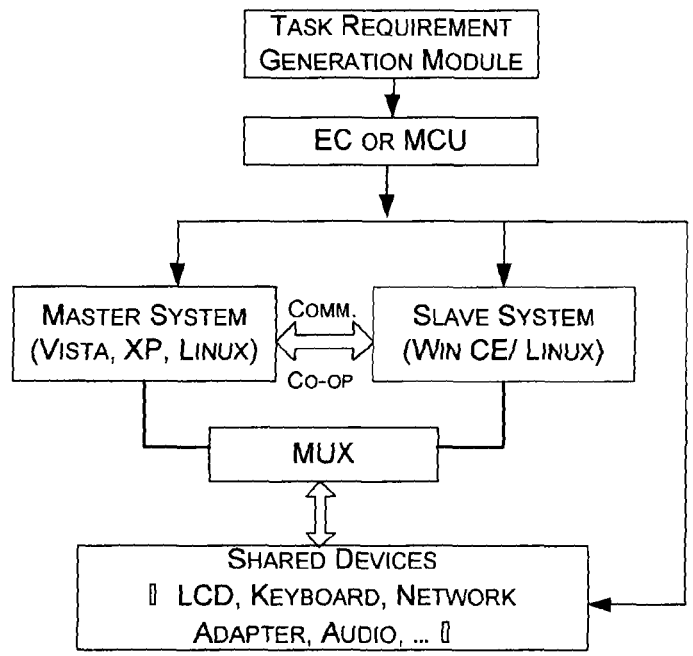
FIG. 1 is a schematic diagram showing an existing structure of a device having a hybrid system.
Figure 2:
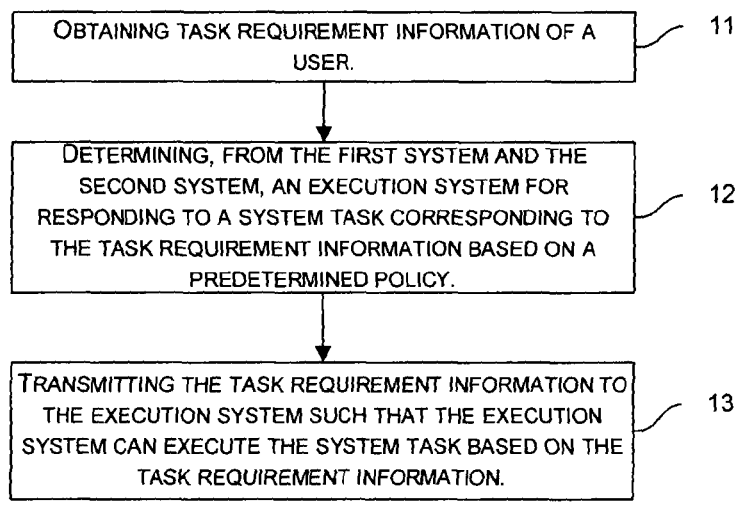
FIG. 2 is a flowchart illustrating a task processing method for a portable device according to an embodiment of the present invention.

FIG. 2 illustrates a task processing method for a portable device according to an embodiment of the present invention. The method is applied to a portable device comprising a first system and a second system, the first system comprising a first hardware system and a first operation system running on the first hardware system, the second system comprising a second hardware system and a second operation system running on the second hardware system. The method comprises the steps of:

obtaining task requirement information of a user (Step 11);

determining, from the first system and the second system, an execution system for responding to a system task corresponding to the task requirement information based on a predetermined policy (Step 12); and transmitting the task requirement information to the execution system such that the execution system can execute the system task based on the task requirement information (Step 13).

By obtaining the task requirement information of the user, it is possible for the portable device corresponding to this embodiment to determine, based on the task requirement information, an execution system for executing a system task corresponding to the task requirement information. In this way, the user can focus on the requirement to be fulfilled, without considering the switching between the systems and the platform for executing the system task (e.g., whether the system task is to be executed by the first system or the second system). Based on the task requirement, the device can automatically schedule the system and resources for fulfilling the user requirement. Thus, the user operation can be changed from system-oriented into application-oriented, such that the user operation can be facilitated and the user experience can be significantly improved.

Figure 3:
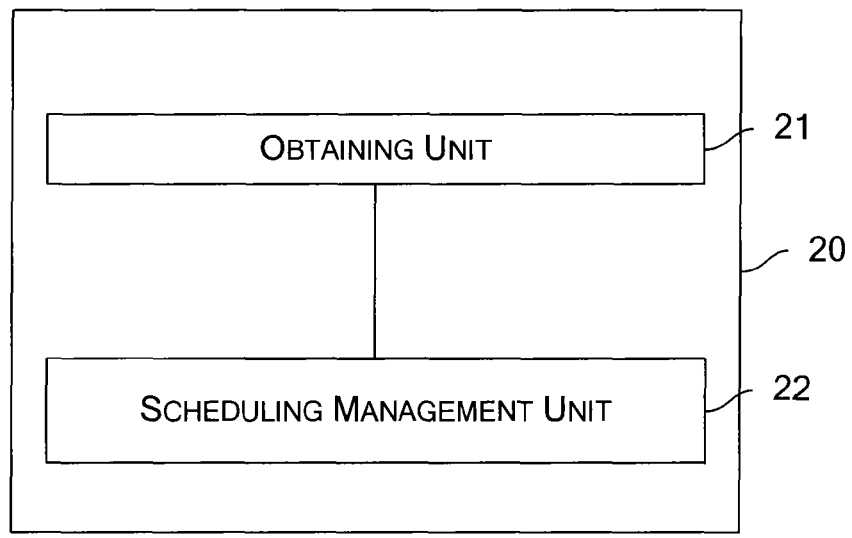
FIG. 3 is a schematic diagram showing an overall structure of a task processing apparatus according to an embodiment of the present invention.

FIG. 3 illustrates a task processing apparatus 20 according to an embodiment of the present invention. The apparatus 20 comprises:

an obtaining unit 21 for obtaining task requirement information of a user; and a scheduling management unit 22 for determining, from the first system and the second system, an execution system for responding to a system task corresponding to the task requirement information based on a predetermined policy and transmitting the task requirement information to the execution system such that the execution system can execute the system task based on the task requirement information.

Specifically, the scheduling management unit 22 can comprise:

a first scheduling management subunit for selecting, based on a slave-system-first policy, the slave system from the first system and the second system as the execution system for the system task corresponding to the task requirement information when both the first and the second systems are in an active state;

a second scheduling management subunit for waking up the slave system and determining the slave system as the execution system for the system task corresponding to the task requirement information when a master system of the first system and the second system is in an active state, the slave system is in an inactive state and it is determined based on the slave-system-first policy that the slave system is required to execute the system task; and a third scheduling management subunit for waking up the master system and determining the master system as the execution system for the system task corresponding to the task requirement information when the master system is in an inactive state, the slave system is in an active state and it is determined based on the slave-system-first policy that the master system is required to execute the system task;

wherein the first scheduling management subunit and the second scheduling management subunit are configured to select the master system as the execution system for the system task corresponding to the task requirement information if the slave system is not capable of executing the system task;

a fourth scheduling management subunit for determining, from the first system and the second system, a system capable of processing the system task corresponding to the task requirement information based on the task requirement information, determining, when the system capable of processing the system task corresponding to the task requirement information is in an active state, the system as the execution system for the system task corresponding to the task requirement information or waking up, when the system capable of processing the system task corresponding to the task requirement information is in an inactive state, the system and determining the system as the execution system for the system task corresponding to the task requirement information.

Preferably, the apparatus can further comprise:

a first synchronization unit for synchronizing the system task corresponding to the task requirement information from the master system to the slave system while waking up the slave system; and a second synchronizing unit for synchronizing the system task corresponding to the task requirement information from the slave system to the master system while waking up the master system.

Preferably, the master system has a higher processing capability than the slave system, while the slave system has lower power consumption than the master system.

Figure 4:
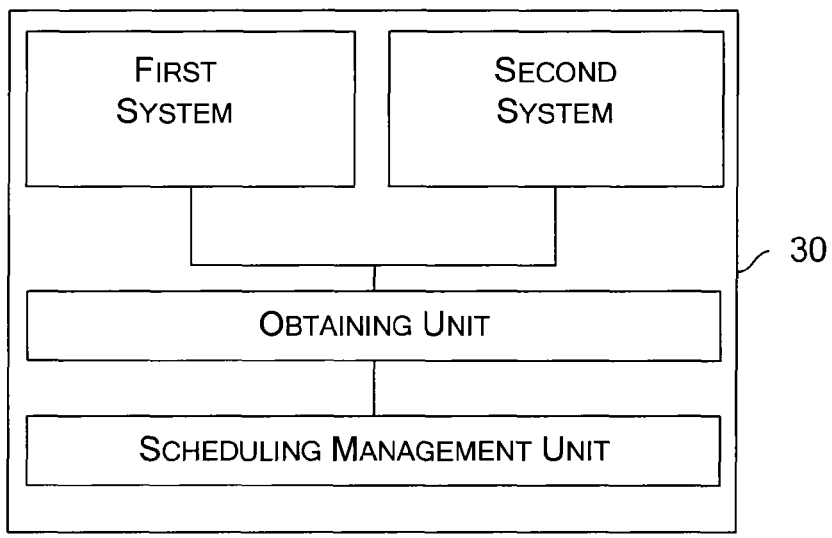
FIG. 4 is a schematic diagram showing an overall structure of a portable device according to an embodiment of the present invention.

FIG. 4 shows a portable device 30 according to an embodiment of the present invention. The portable device 30 comprises:

a first system comprising a first hardware system and a first operation system running on the first hardware system;

a second system comprising a second hardware system and a second operation system running on the second hardware system;

wherein the portable device further comprises:

an obtaining unit for obtaining task requirement information of a user; and a scheduling management unit for determining, from the first system and the second system, an execution system for responding to a system task corresponding to the task requirement information based on a predetermined policy and transmitting the task requirement information to the execution system such that the execution system can execute the system task based on the task requirement information.

Moreover, all the features of the above method and apparatus embodiments are applicable to the embodiment of the portable device, and the detailed description thereof is thus omitted here.

Figure 5:
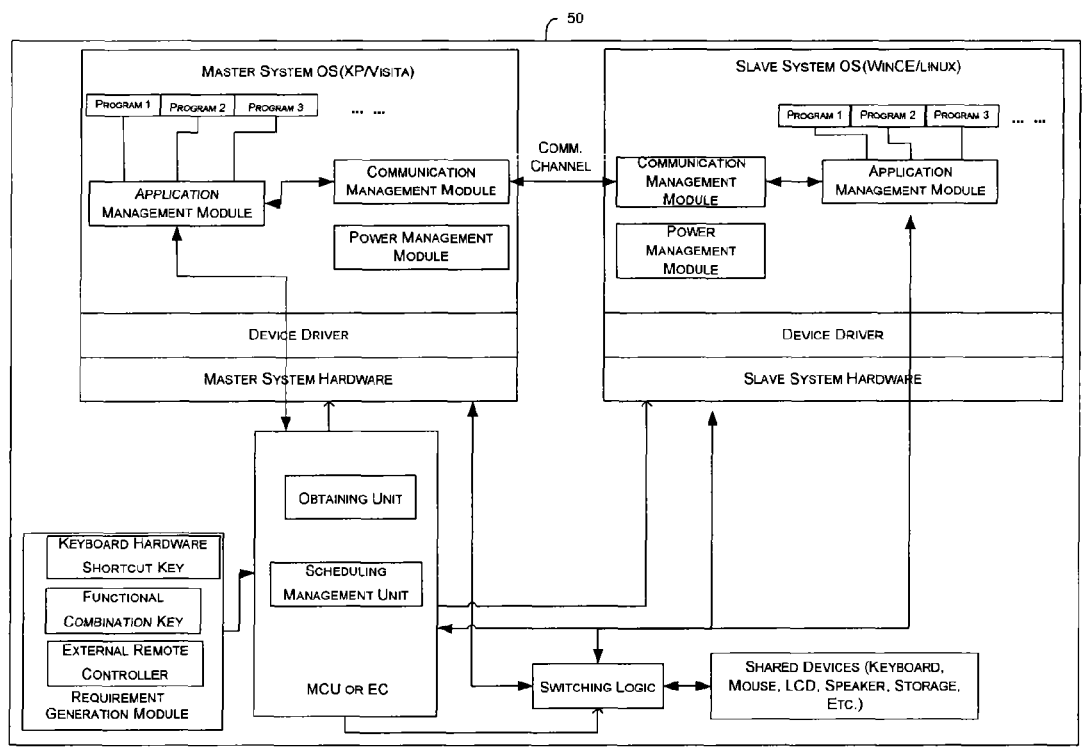
FIG. 5 is a schematic diagram showing an embodiment of the structure of the device as shown in FIG. 4.

Specifically, the portable device as shown in FIG. 4 can have the particular structure as illustrated in FIG. 5. Herein, the above first system may be a master system and the second system may be a slave system. Alternatively, of course, the first system may be a slave system and the second system may be a master system. The illustration in FIG. 5 is exemplary only and does not limit the variants of this embodiment. The master system has a higher processing capability than the slave system, while the slave system has lower power consumption than the master system.

In this embodiment, the obtaining unit and the scheduling management unit can be provided in an EC of the first hardware system or in a newly added MCU of the first hardware system. Alternatively, the obtaining unit and the scheduling management unit can be provided in an MCU or an EC of the second hardware system. The EC or the MCU is shown in the figure as a separated element, meaning that the EC or the MCU can be EC or MCU of the first hardware system or of the second hardware system.

Further, in the portable device, the master system may include: at least one program (such a Program 1, Program 2, Program 3, . . . ) each being an application capable of fulfilling a certain task requirement of the user; an application management module for managing and scheduling the program according to the user requirements and instructions; a power management module for managing the power supplied to the master system; a device driver for driving a hardware device of the master system such that the hardware system of the master system can function properly; and a master system communication management module for providing a communication channel to communicate with the slave system.

Also, the slave system may include: at least one program (such a Program 1, Program 2, Program 3, . . . ) each being an application capable of fulfilling a certain task requirement of the user; an application management module for managing and scheduling the program according to the user requirements and instructions; a power management module for managing the power supplied to the slave system; a device driver for driving a hardware device of the slave system such that the hardware system of the slave system can function properly; and a slave system communication management module for providing a communication channel to communicate with the master system.

The master and slave systems can further comprise a switching logic for switching, based on the task requirement information generated by the user with a requirement generation module, shared devices needed for the system task corresponding to the task requirement information to the system capable of executing the system task for executing the system task such that the system can execute the system task.

Figure 6:
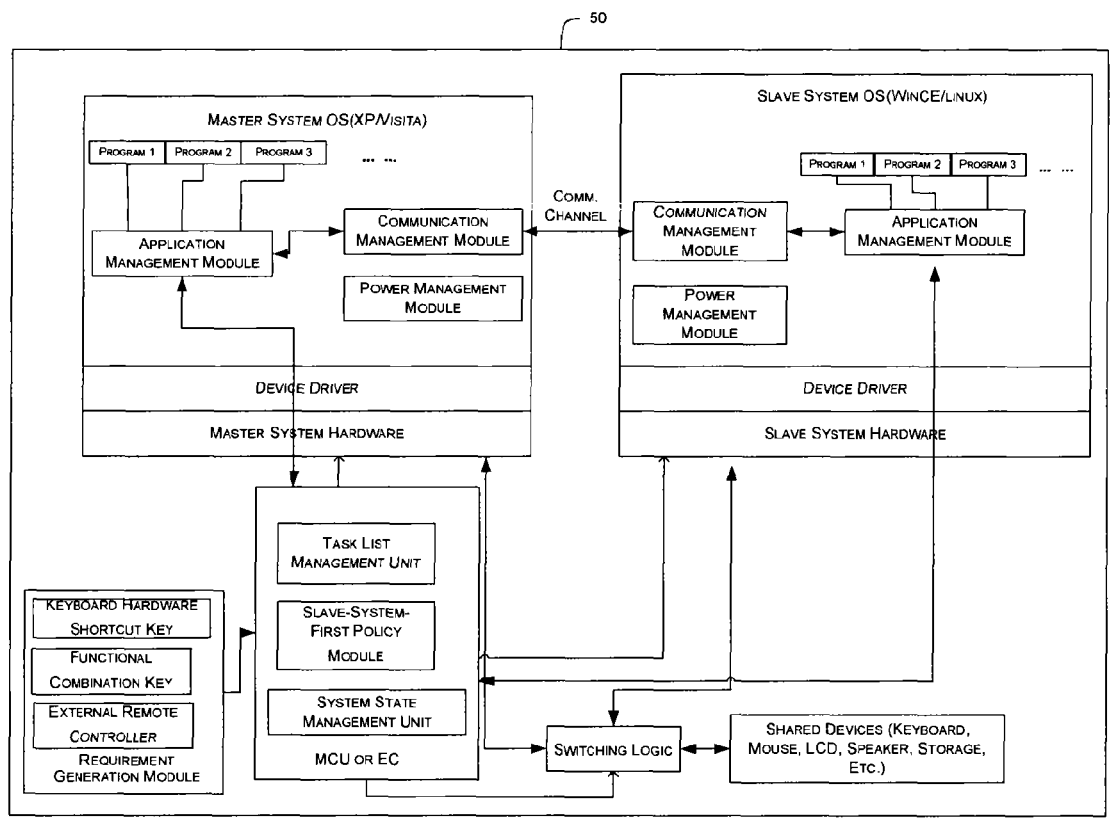
FIG. 6 is a schematic diagram showing an embodiment of the structure of the device as shown in FIG. 5.
Figure 7:
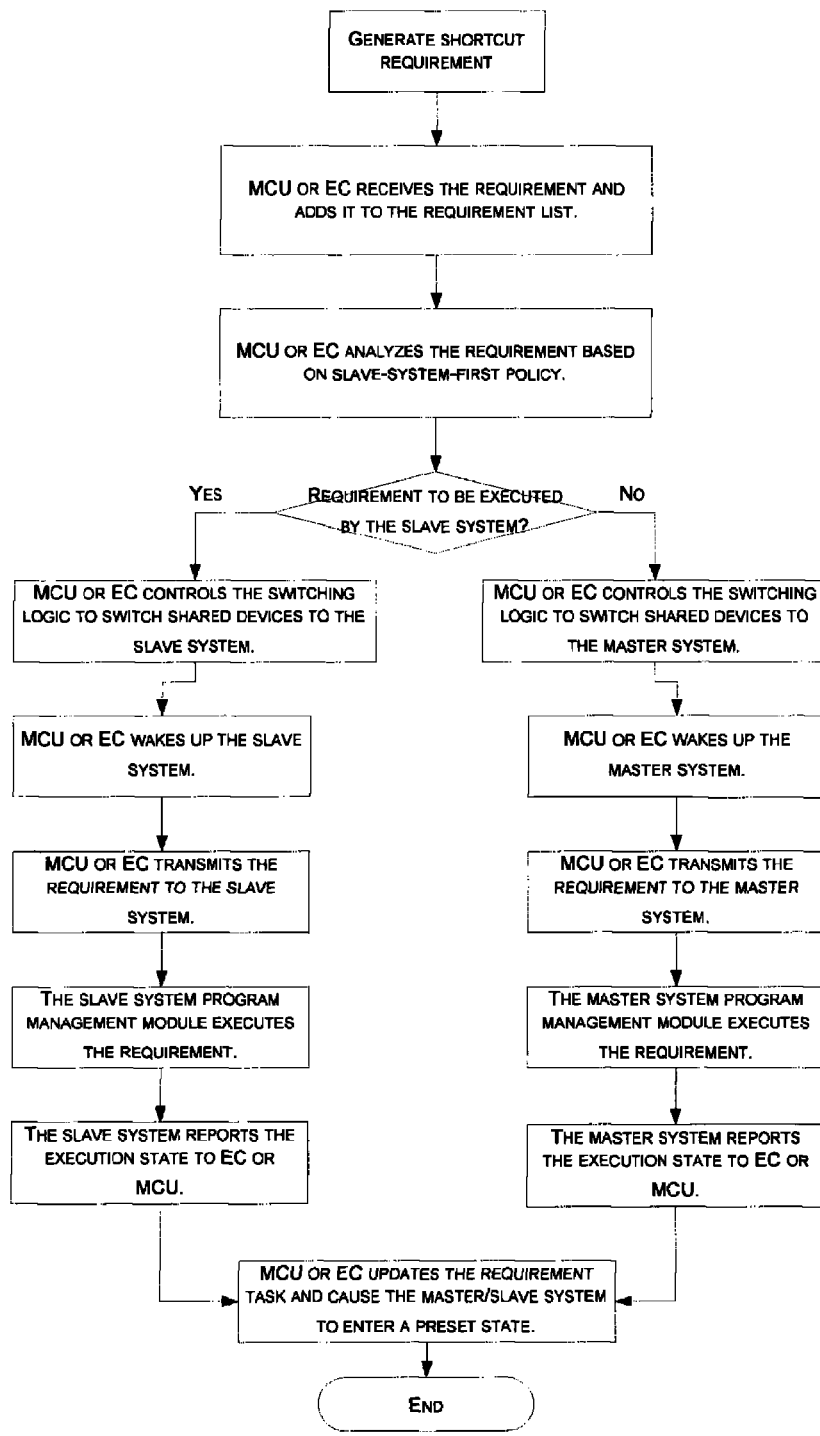
FIG. 7 is a flowchart illustrating an embodiment of the application of the device as shown in FIG. 6.

FIG. 7 illustrates an embodiment of the process carried out by the device as shown in FIG. 5 and FIG. 6.

At step 1, a user generates task requirement information by operating a requirement generation module, which can be an external remote controller, a keyboard, o a hardware shortcut key.

At step 2, an EC or a newly added MCU obtains the task requirement information.

At step 3, it is determined, based on a slave-system-first policy, whether the task requirement information is to be responded by the master system or the slave system. For example, if the task corresponding to the requirement information of the user is to play a video file, the task requirement information can be responded by both the master and the slave systems. However, the slave system is more suitable for responding to the task requirement information and enhancing the user experience since it has lower system power consumption and a simpler hardware architecture. Of course, if the slave system is incapable of or insufficient for responding to the task requirement information of the user, the master system is required to respond to the task requirement information. For example, if the task corresponding to the task requirement information is to play a large 3D network game which is computationally expensive, the slave system may not be sufficient to respond to the user requirement. In this case, the master system, which has a higher processing capability, can respond to the task requirement information of the user, such that the user experience can be improved.

At step 4, if it is determined that the task corresponding to the task requirement information is to be executed by the slave system, the EC or the MCU controls a switching logic to switch shared devices to the slave system and transmits the task requirement information to the slave system.

At step 5, the slave system responds to the task requirement information.

Of course, at step 4, if it is determined that the task corresponding to the task requirement information is to be executed by the master system, the EC or the MCU controls a switching logic to switch shared devices to the master system and transmits the task requirement information to the master system. Accordingly, at step 5, the master system responds to the task requirement information.

As another example according to this embodiment, the requirement generation module can be a software program provided in the EC or the MCU. In this case, the shared devices are connected to the EC or the MCU. The interface of the software program is displayed on a display unit (e.g., a display screen) of the portable device, such that the user can operate on the interface of the software program using an input device of the shared devices. For example, using a mouse (or a touchpad), the user can click an icon of a particular application (such as an icon for video play) on the interface for a set of software programs. In this way, the EC or the MCU can obtain the task requirement information corresponding to the icon clicked by the user. Then, the above steps 1 to 5 can be carried out. Herein, at step 4, only the task requirement information is transmitted to an execution system which is determined from the master and the slave systems for executing the task corresponding to the task requirement information. At this time, the shared devices have not been switched and the interface of the software program remains to be displayed to the user. When the execution system completes pre-processing operations and needs to provide a shared device to the user for input or display, the EC or the MCU then switches the corresponding shared device to the execution system. For example, when the user clicks an icon for network browsing (e.g., an icon of IE browser) on the foreground display interface, the EC or the MCU obtains the task requirement information indicating a task of network browsing. Then, the EC or the MCU determines that the execution system for responding to the task requirement information is the slave system. If the slave system has not been started at this time, then it is started in the background. Afterwards, the slave system configures the network to ensure that the network connection is OK, and then invokes a specific application for network browsing. After finishing all these preparations, the slave system informs the EC or the MCU that the background processing is completed. Then, the EC or the MCU switches the shared devices to the slave system. That is, the display device can be switched to the slave system, such that the specific application for network browsing can be displayed to the user in the foreground. Also, the input device can be switched to the slave system such that the user can enter a website address or performs a click operation on the specific application. In this way, the user only needs to consider the task he/she desires to accomplish. That is, when the user clicks an icon in a display interface, the portable device provides a corresponding (foreground) response. Thus, the user does not need to care which (background) system of the master and the slave systems responds to and handles the task.

Specifically, as shown in FIG. 7, the obtaining unit for obtaining the task requirement information of the user can be provided in an EC or a newly added MCU of the first hardware system. Of course, as an alternative, it can be provided in an MCU or an EC of the second hardware system. In particular, the obtaining unit can comprise a task list management module for managing a plurality of task requirement lists each corresponding to a shortcut key of the requirement generation module or an icon in the display interface of the software program, thereby determining the specific task requirement information of the user. The scheduling management unit is configured for determining, from the first system and the second system, an execution system for responding to a system task corresponding to the task requirement information based on a predetermined policy and transmitting the task requirement information to the execution system such that the execution system can execute the system task based on the task requirement information. In particular, the scheduling management unit can comprise: a subsystem-first policy module for setting a policy of first selecting the subsystem (i.e., the slave system) as the execution system for the task requirement; a system state management module for monitoring the operation states of the master and the slave systems and driving the execution system to execute the required task based on the monitored states. Specifically, based on the task requirement information obtained by the obtaining unit, the subsystem-first policy module of the EC or the MCU determines which one of the master and the slave systems is going to execute the task corresponding to the task requirement information according to the above policy. When it is determined that the slave system is going to execute the task corresponding to the task requirement information, the current state of the slave system can be monitored by the system state management module and the corresponding actions can be determined based on the current state of the slave system. For example, if the slave system is in a power-off state, it is necessary to control to start it; if the slave system is in a sleep state, it is necessary to control to wake it up. That is, the task requirement information will not be transmitted to the salve system until it is in an active state. If the slave system is in a power-on state, the task requirement information can be transmitted directly to the slave system.

Figure 8:
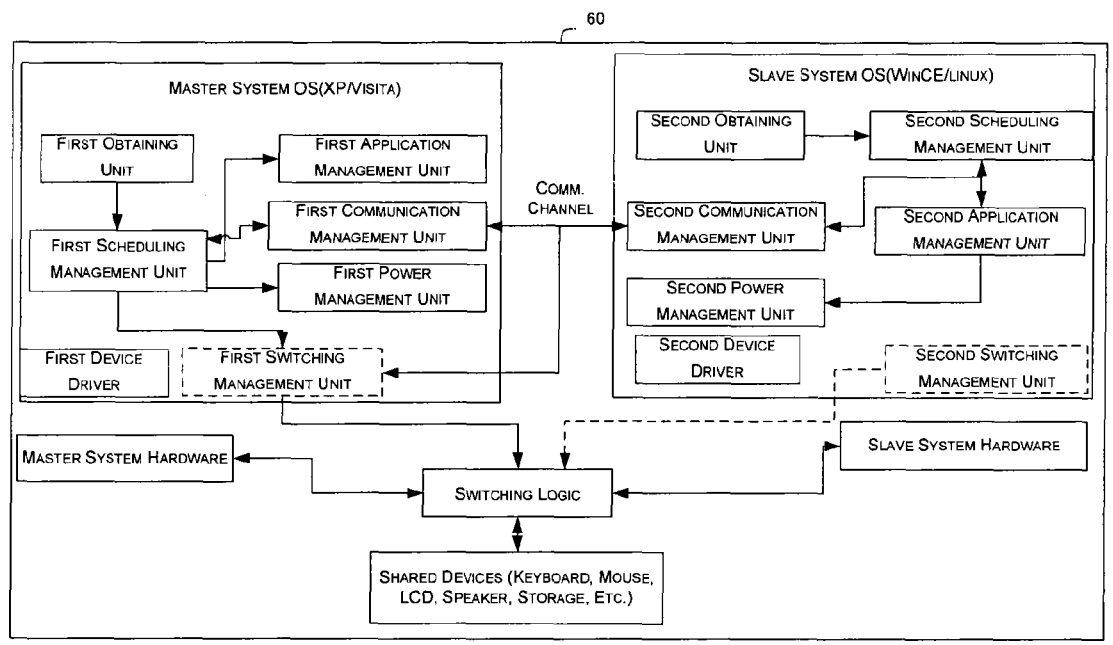
FIG. 8 is a schematic diagram showing another embodiment of the structure of the device as shown in FIG. 4.

FIG. 8 is a schematic diagram showing another embodiment of the structure of the device as shown in FIG. 4. In the portable device 60 as shown in FIG. 8, the first system as described above may be the master system and the second system may be the slave system. Of course, the first system may be the slave system and the second system may be the master system. The example shown in FIG. 8 is illustrative only, rather than limiting the variants of this embodiment.

The first operation system as described above may comprise: a first obtaining unit, a first scheduling management unit, a first application management unit, a first communication management unit, a first power management unit, a first switching management unit and a first device driver.

The first obtaining unit is the same as the above obtaining unit as shown in FIG. 4. The first scheduling management unit is the same as the above scheduling management unit as shown in FIG. 4.

The first application management unit is configured to manage all the applications for the master system. When the first scheduling management unit needs to invoke an application according to a task requirement input from the user, the first application management unit can invoke the application accordingly.

The first switching management unit is configured to transmit, according to an instruction from the first scheduling management unit, an instruction to the switching logic instructing to switch the use of shared devices to the master system or the slave system.

The first communication management unit is configured to communicate with the slave system, for example, to synchronize information with the slave system.

The first power management unit is configured to manage the power supplied to the master system. For example, the first power management unit can instruct the master system to enter a sleep state according to an instruction from the first scheduling management unit.

The first device driver is configured to provide a driving program to the hardware of the master system, such that the hardware can function properly.

On the other hand, the slave system can comprise: a second obtaining unit, a second scheduling management unit, a second application management unit, a second communication management unit, a second power management unit, a second switching management unit and a second device driver.

Herein, the second obtaining unit is the same as the above obtaining unit as shown in FIG. 4 and the second scheduling management unit is the same as the above scheduling management unit as shown in FIG. 4.

The second application management unit is configured to manage all the applications for the slave system. When the second scheduling management unit needs to invoke an application according to a task requirement input from the user, the second application management unit can invoke the application accordingly.

The second switching management unit is configured to transmit, according to an instruction from the second scheduling management unit, an instruction to the switching logic instructing to switch the use of shared devices to the master system or the slave system.

The second communication management unit is configured to communicate with the master system, for example, to synchronize information with the master system.

The second power management unit is configured to manage the power supplied to the slave system. For example, the second power management unit can instruct the slave system to enter a sleep state according to an instruction from the second scheduling management unit.

The second device driver is configured to provide a driving program to the hardware of the slave system, such that the hardware can function properly.

Preferably, the device may further comprise hardware shared between the master and the slave systems. The shared hardware may include: a keyboard, a mouse, a LCD screen, a speaker, a storage, or the like.

Specifically, as shown in FIG. 8, the slave system is in a foreground operation state and the master system can be in a background operation state, a power-off state or a sleep state. The shared hardware is currently used by the slave system. For example, the display screen currently displays a situation in which the current desktop, mouse, keyboard, speaker and storage are all used by the slave system.

As an example, the user may click an icon for a 3D game on the desktop of the slave system using the mouse or the keyboard. Then, the second obtaining unit of the slave system immediately obtains the task requirement information for the 3D game program and transmits it to the second scheduling management unit. The second scheduling management unit can determine, based on the task requirement information, whether the current slave system is capable of executing the 3D game program. If the slave system is capable of executing the 3D game program, then the slave system is selected first as the execution system for the 3D game program. When the slave system executes the 3D game program, the second application management unit invokes and executes the program related to the 3D game. If the slave system is not capable of executing the 3D game program, it is possible to switch to the master system as the execution system for this task requirement. In particular, there are the following possibilities:

1) The master system is currently in a power-off state. In this case, the EC or the MCU of the slave system wakes up the first power management unit of the master system to power on the master system.
2) The master system is currently in a sleep state. In this case, the EC or the MCU of the slave system wakes up the master system.
3) After the master system is powered on or woke up, the second communication management unit of the slave system synchronizes the task requirement information to the first communication management unit of the master system via a communication channel. Then, the first communication management unit transmits the task requirement information to the first scheduling management unit, which in turn schedules the first application management unit for invoking information related to the 3D game program and executing the 3D game.

While the task requirement information is synchronized to the master system, it is also necessary to switch the hardware devices required for the execution of the 3D game in the background. For example, device information on the shared hardware (such as the speaker) can also be synchronized to the master system by the switching logic.

At this time, switching between display interfaces is most apparent to the user. There are two possibilities with respect to the switching between display interfaces on the display screen of the shared hardware.

On one hand, when the 3D game program is switched from the slave system to the master system in the background, the switching logic automatically switches from the display interface of the slave system to the display interface of the master system. That is, the display screen is switched from being used by the slave system to being used by the master system. In this case, the user may see an instantaneous black screen during the switching. However, the user does not need to perform manual switching; the determination is made and switching operation is carried out automatically.

On the other hand, when the 3D game program is switched from the slave system to the master system in the background, the master system can synchronize all the information displayed during the execution of the 3D game to the slave system via the first communication management unit. In this way, all the pictures to be displayed during the execution of the 3D game can be displayed on the display interface of the slave system. In this case, the display screen of the shared hardware is still used by the slave system, since the switching logic does not switch the use of the display screen to the master system. As such, the user will not perceive any switch or change between the interfaces as all the switching operations are carried out in the background. Thus, the user does not need to perform manual switching, such that the user experience can be improved.

Next, an embodiment of the above solution according to the present invention will be explained with reference to a detailed flowchart.

In particular, for the above portable device as shown in FIGS. 5, 6 and 8, the above step 11 may comprise: obtaining the task requirement information of the user via a task input hardware equipment; or obtaining the task requirement information of the user via a task input application.

Herein, the task input hardware equipment comprises a keyboard, a mouse and/or a remote controller; and the step of obtaining the task requirement information of the user via a task input application comprises: obtaining a task requirement input by the user in a task input interface and generating the task requirement information based on the input task requirement. Specifically, there may be a number of task requirement options in the task input interface. The user can select one or more of the task requirement options by clicking the option(s) with mouse, selecting the option(s) with a keyboard or by touching the option(s). After such selection, the task input application can determine the location coordinates of the selected task requirement(s) and generate the task requirement information based on the location coordinates.

Additionally, the above step 12 can comprise: selecting, based on a slave-system-first policy, a slave system from the first system and the second system, or, if the slave system is not capable of executing the system task, a master system from the first system and the second system, as the execution system for the system task corresponding to the task requirement information.

The slave system is typically a system dedicated to a particular application and has low power consumption and good performance. Thus, the power consumption of the entire system can be lowered and the task requirement can be handled with a high performance by adopting the slave-system-first policy.

Herein, the step of selecting based on a slave-system-first policy a slave system from the first system and the second system as the execution system for the system task corresponding to the task requirement information comprises:
  selecting, based on the slave-system-first policy, the slave system as the execution system for the system task corresponding to the task requirement information when both the master and the slave systems are in an active state;
  waking up the slave system and determining the slave system as the execution system for the system task corresponding to the task requirement information when the master system is in an active state, the slave system is in an inactive state and it is determined based on the slave-system-first policy that the slave system is required to execute the system task; and
  waking up the master system and determining the master system as the execution system for the system task corresponding to the task requirement information when the master system is in an inactive state, the slave system is in an active state and it is determined based on the slave-system-first policy that the master system is required to execute the system task.

Of course, as an alternative, a policy in which the overall system performance is taken into account can be used instead of the slave-system-first policy.

In this case, the above step 12 can comprise:
  determining, from the first system and the second system, a system capable of processing the system task corresponding to the task requirement information based on the task requirement information;
  determining, when the system capable of processing the system task corresponding to the task requirement information is in an active state, the system as the execution system for the system task corresponding to the task requirement information; or waking up, when the system capable of processing the system task corresponding to the task requirement information is in an inactive state, the system and determining the system as the execution system for the system task corresponding to the task requirement information.

Preferably, when there are at least two systems being in an active state and capable of processing the system task corresponding to the task requirement information, the system having lower power consumption and higher processing efficiency from the at least two systems is determined as the execution system for the system task corresponding to the task requirement information; or when there are at least two systems being woke up and capable of processing the system task corresponding to the task requirement information, the system having lower power consumption and higher processing efficiency from the at least two systems is determined as the execution system for the system task corresponding to the task requirement information. In this way, the power consumption can be further reduced.

Figure 9:
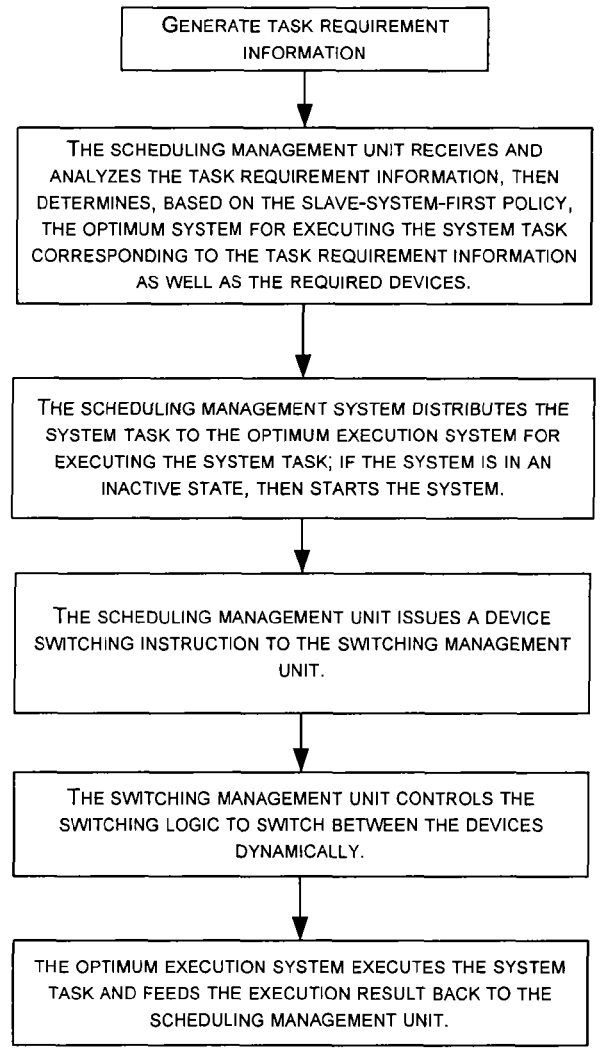
FIG. 9 is a flowchart illustrating an embodiment of the method as shown in FIG. 3.

FIG. 9 illustrates the specific process for the above steps.

As shown in FIG. 9, the user obtains the task requirement information via a task generation interface provided by the master system or the slave system or via a task input device such as a keyboard, a mouse or a remote controller.

The scheduling management unit receives and analyzes the task requirement information, then determines, based on the slave-system-first policy, the optimum system for executing the system task corresponding to the task requirement information as well as the required devices. In this step, if the slave system is capable of executing the system task, then the slave system is selected first as the execution system for executing the system task; otherwise, it is necessary to select the master system as the execution system for executing the system task. Herein, the scheduling management unit is the scheduling management unit of the system which is currently in an active state. If all the systems in the hybrid system are in the active state, the scheduling management unit is by default the scheduling management unit of the master system, i.e., the first scheduling management unit as described above. Of course, as an alternative, the scheduling management unit can be set as the scheduling management unit of the slave system, i.e., the second scheduling management unit as described above.

The scheduling management system distributes the system task corresponding to the task requirement information to the above determined execution system for executing the system task. For example, if it is determined that the slave system can execute the current system task, the system task is distributed to the slave system. If the slave system is currently in an inactive state, it can be started by the MCU or the EC. Alternatively, if it is determined that the slave system cannot execute the system but the master system can, the system task is distributed to the master system directly.

The scheduling management unit can issue a device switching instruction to the switching management unit. If the slave system is determined as the execution system for the system task, the second scheduling management unit issues a device switching instruction to the second switching management unit. Alternatively, if the master system is determined as the execution system for the system task, the first scheduling management unit issues a device switching instruction to the first switching management unit.

The switching management unit controls the switching logic to switch between the devices dynamically.

Then, the above determined optimum execution system executes the system task and feeds the execution result back to the corresponding scheduling management unit.

Figure 10:
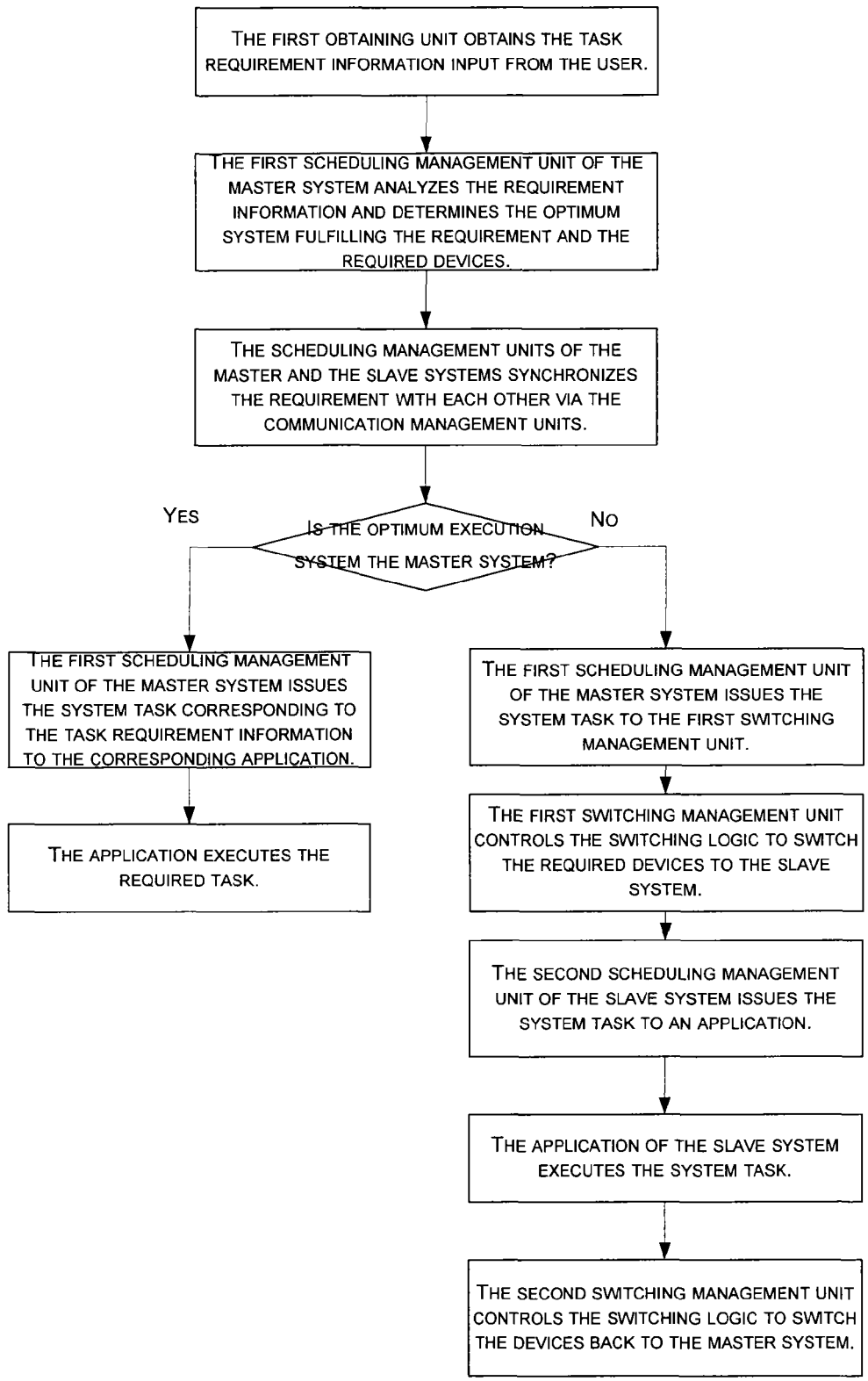
FIG. 10 is a flowchart illustrating the method as shown in FIG. 9, in which both the master system and the slave system are in an active state.

Specifically, when both the master and the slave system of the hybrid system are in an active state, the slave system can be selected as the execution system for executing the system task based on a slave-system-first policy. FIG. 10 illustrates this process. In this case, the scheduling management units for both systems are in an active state and maintain information synchronization with each other via the respective communication management units. The shared devices are occupied by the master system by default.

In the hybrid system, when the master system is in an active state while the slave system is in an inactive (e.g., standby, sleep, or power-off) state, if it is determined based on the slave-system-first policy that the slave system is required to execute the system task, the slave system can be woke up and determined as the execution system for the system task. In this case, the process is similar to the process as shown in FIG. 9. However, it is the slave system that is required to execute the system task, the first scheduling management unit of the master system needs to initiate or wake up the slave system via the first communication module and then issue the system task.

Figure 11:
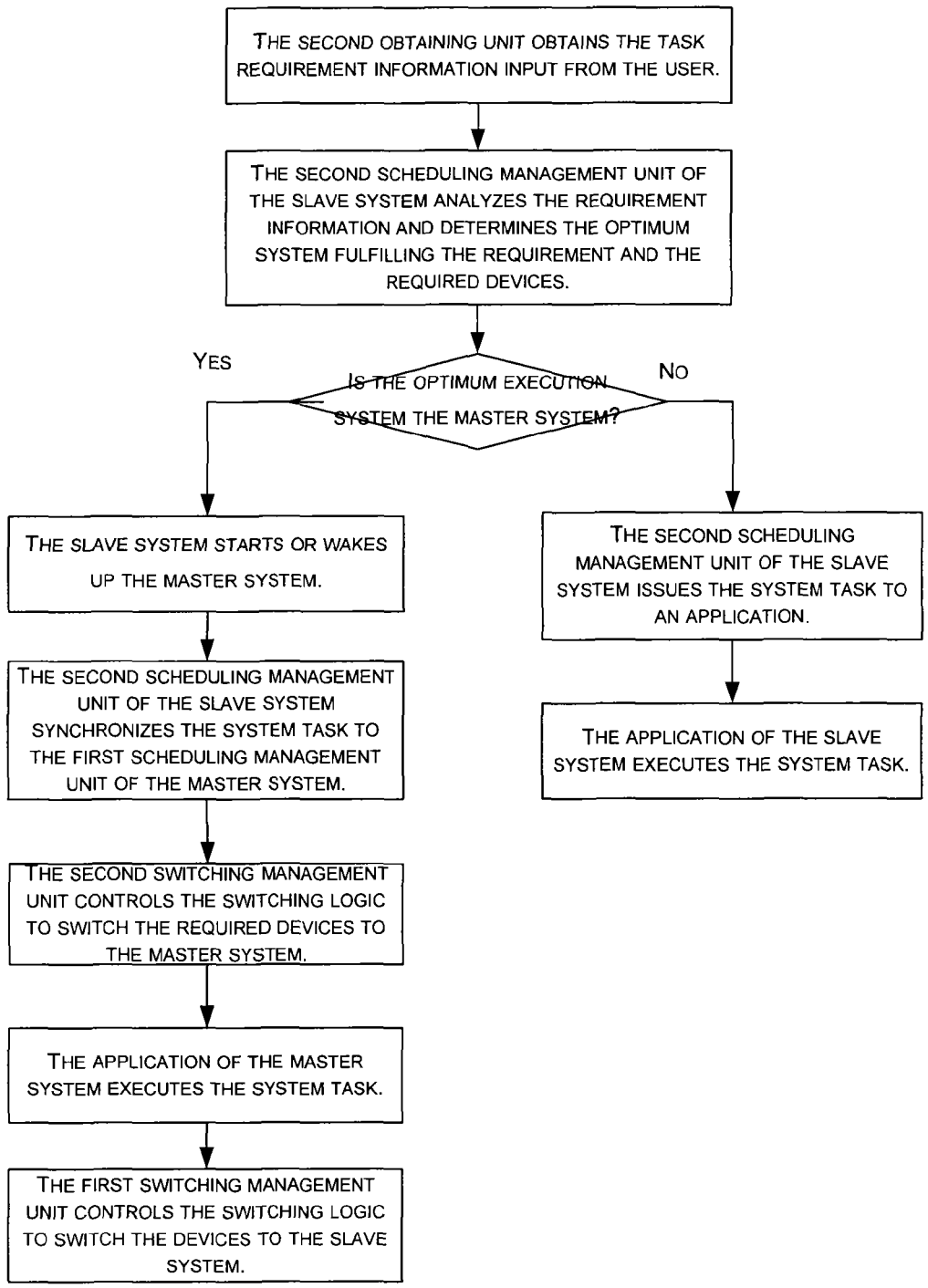
FIG. 11 is a flowchart illustrating the method as shown in FIG. 9, in which the master system is in a sleep/standby state while the slave system is in an active state.

Alternatively, in the hybrid system, when the master system is in an inactive state while the slave system is in an active state, if it is determined based on the slave-system-first policy that the master system is required to execute the system task, the master system can be woke up and determined as the execution system for the system task. FIG. 11 illustrates this process in which the slave system is operating and the master slave is in a standby, sleep or power-off state. In this case, the second obtaining unit of the slave system can obtain the task requirement information and the second scheduling management unit of the slave system can analyze the task requirement.

When the slave system is woke up, as described above, the system task can be synchronized from the master system to the slave system.

When the master system is woke up, as described above, the system task can be synchronized from the slave system to the master system.

Specifically, the step of waking up the slave system can comprise: waking up the slave system by an EC or an MCU. Likewise, the step of waking up the master system can comprise: waking up the master system by an EC or an MCU.

In a particular implementation, the function of the EC or the MCU in the system is to wake up the corresponding system. Of course, the above obtaining unit and scheduling management unit can be embedded into the EC or the MCU. In this way, the EC or the MCU can take over the obtaining function of the obtaining unit, the system scheduling function of the scheduling management unit and other control functions such as determining the operation state of a system, controlling the switching logic (to switch the shared devices), controlling synchronization, controlling sleep/standby state of a system, and the like.

In all the above embodiments, after the slave system as the execution system for the system task completing the execution of the system task, the device resource involved in execution of the system task by the slave system can be synchronized to the master system.

In this way, an interface with which the user is familiar can remain unchanged for the user. The operations, such as selecting and switching the system, synchronizing data between the master and the slave systems and executing the required task, can all be performed in the background while the interface displayed in the foreground remains to be an interface opened by the user. Thus, the user does not need to switch between the systems, such that the user experience can be improved.

Further, after the device resource is synchronized (i.e., returned) to the master system, the slave system can be configured to enter a sleep/standby state, so as to further reduce the power consumption. Additionally, in the above embodiments of the apparatus and the portable device, the scheduling management unit may be a scheduling management application or a processing chip having the above scheduling function.

Next, an exemplary application scenario will be described. In this application scenario, the following is assumed:

User requirement: playing a video file;
System States: the master system is active, with all the peripheral devices under control, and the slave system is inactive;
Requirement analysis: video play is a task preferably executed by the slave system; and
Execution policy: slave-system-first.
The process is as follows.

1) The user directly selects the video file to be played in the master system environment.

2) The obtaining unit intercepts the task requirement information.

3) The scheduling management unit receives the task requirement information and analyzes the system task corresponding to the task requirement information based on the slave-system-first policy.

4) The embedded slave system EC (i.e., a slave system embedded in the master system) is selected as the execution system.

5) The embedded slave system (i.e., the slave system) is started; the speaker and the LCD are switched to the slave system.

6) The slave system plays the video file.

7) The process returns to the master system.

There may be a simplified relationship between the master and the slave systems, in which the applications the plurality of systems can execute appear as application plug-ins on the master system interface, such that the extraction of requirement and the determination process become relatively simpler. That is, the slave system executes an application only if the application is selected by the user directly. In the above embodiments of the device according to the present invention, there can be a plurality of slave systems each interacting with the master system in the same manner as described above.

To summarize, according to the above embodiments of the present invention, all resources of a hybrid system can be managed collectively depending on implementation requirements, so as to achieve optimal resource utilization and functionality maximization. The user of the hybrid system will face a universal platform in which individual slave systems is transparent to the user. The user only needs to generate a task requirement. The hybrid system can autonomously determine which system is required to execute the task without user intervention. Further, the hybrid system can always execute the task using the most capable system, so as to achieve high efficiency and low power consumption. Based on such policy, the implementation complexity of the hybrid system can be significantly reduced and the problems with respect to the operation system and switching of the slave system can be mitigated. In this way, the slave system exists as a relatively transparent system in the background and has a great potential of being converted into real world applications and products.

While the present invention has been described with reference to the above preferred embodiments, a number of variants and modifications can be made by those skilled in the art without departing from the scope of the present invention.

What is claimed is:

1. A task processing method applied to a portable device comprising a first system, a second system, and a display, the first system comprising a first hardware system and a first operation system running on the first hardware system, the second system comprising a second hardware system and a second operation system running on the second hardware system, the display being shared between the first and the second systems, the method comprising the steps of:

obtaining a task requirement input by a user in a task input interface displayed on the display and generating task requirement information based on the task requirement input;

determining, from the first system and the second system, an execution system for responding to a system task corresponding to the task requirement information based on a predetermined policy; and transmitting the task requirement information to the execution system such that the execution system can execute the system task based on the task requirement information, and wherein the execution system executes the system task in the background, while the interface displayed on the display remains to be unchanged whatever which one of the first and second systems are determined to be the execution system.

2. The method according to claim 1, wherein the step of determining from the first system and the second system an execution system for responding to a system task corresponding to the task requirement information based on a predetermined policy comprises:

selecting, based on a slave-system-first policy, a slave system from the first system and the second system, or, if the slave system is not capable of executing the system task, a master system from the first system and the second system, as the execution system for the system task corresponding to the task requirement information.

3. The method according to claim 2, wherein the step of selecting based on a slave-system-first policy a slave system from the first system and the second system as the execution system for the system task corresponding to the task requirement information comprises:

selecting, based on the slave-system-first policy, the slave system as the execution system for the system task corresponding to the task requirement information when both the master and the slave systems are in an active state;

waking up the slave system and determining the slave system as the execution system for the system task corresponding to the task requirement information when the master system is in an active state, the slave system is in an inactive state and it is determined based on the slave-system-first policy that the slave system is required to execute the system task; and waking up the master system and determining the master system as the execution system for the system task corresponding to the task requirement information when the master system is in an inactive state, the slave system is in an active state and it is determined based on the slave-system-first policy that the master system is required to execute the system task.

4. The method according to claim 3, wherein waking up the slave system further comprises:

synchronizing the system task corresponding to the task requirement information from the master system to the slave system; and waking up the master system further comprises:
synchronizing the system task corresponding to the task requirement information from the slave system to the master system.

5. The method according to claim 4, further comprising, after the slave system as the execution system for the system task corresponding to the task requirement information completing the execution of the system task:
synchronizing to the master system device resource involved in execution of the system task by the slave system.

6. The method according to claim 1, wherein the step of determining from the first system and the second system an execution system for responding to a system task corresponding to the task requirement information based on a predetermined policy comprises:
determining, from the first system and the second system, a system capable of processing the system task corresponding to the task requirement information based on the task requirement information;
determining, when the system capable of processing the system task corresponding to the task requirement information is in an active state, the system as the execution system for the system task corresponding to the task requirement information; or
waking up, when the system capable of processing the system task corresponding to the task requirement information is in an inactive state, the system and determining the system as the execution system for the system task corresponding to the task requirement information.

7. The method according to claim 6, wherein
when there are at least two systems being in an active state and capable of processing the system task corresponding to the task requirement information, the system having lower power consumption and higher processing efficiency from the at least two systems is determined as the execution system for the system task corresponding to the task requirement information; or
when there are at least two systems being woke up and capable of processing the system task corresponding to the task requirement information, the system having lower power consumption and higher processing efficiency from the at least two systems is determined as the execution system for the system task corresponding to the task requirement information.

8. A task processing apparatus applied to a portable device comprising a first system, a second system, and a display, the first system comprising a first hardware system and a first operation system running on the first hardware system, the second system comprising a second hardware system and a second operation system running on the second hardware system, the display being shared between the first and second systems, the apparatus comprising:
an obtaining unit for obtaining a task requirement input by a user in a task input interface displayed on the display and generating task requirement information based on the task requirement input; and
a scheduling management unit for determining, from the first system and the second system, an execution system for responding to a system task corresponding to the task requirement information based on a predetermined policy and transmitting the task requirement information to the execution system such that the execution system can execute the system task based on the task requirement information,
wherein the execution system executes the system task in the background, while the interface displayed on the display remains to be unchanged whatever which one of the first and second systems are determined to be the execution system.

9. The apparatus according to claim 8, wherein the scheduling management unit comprises:
a first scheduling management subunit for selecting, based on a slave-system-first policy, a slave system from the first system and the second system as the execution system for the system task corresponding to the task requirement information when both the first and the second systems are in an active state;
a second scheduling management subunit for waking up the slave system and determining the slave system as the execution system for the system task corresponding to the task requirement information when a master system of the first system and the second system is in an active state, the slave system is in an inactive state and it is determined based on the slave-system-first policy that the slave system is required to execute the system task; and
a third scheduling management subunit for waking up the master system and determining the master system as the execution system for the system task corresponding to the task requirement information when the master system is in an inactive state, the slave system is in an active state and it is determined based on the slave-system-first policy that the master system is required to execute the system task;
wherein the first scheduling management subunit and the second scheduling management subunit are configured to select the master system as the execution system for the system task corresponding to the task requirement information if the slave system is not capable of executing the system task;
a fourth scheduling management subunit for determining, from the first system and the second system, a system capable of processing the system task corresponding to the task requirement information based on the task requirement information, determining, when the system capable of processing the system task corresponding to the task requirement information is in an active state, the system as the execution system for the system task corresponding to the task requirement information or waking up, when the system capable of processing the system task corresponding to the task requirement information is in an inactive state, the system and determining the system as the execution system for the system task corresponding to the task requirement information.

10. The apparatus according to claim 9, further comprising:
a first synchronization unit for synchronizing the system task corresponding to the task requirement information from the master system to the slave system while waking up the slave system; and
a second synchronizing unit for synchronizing the system task corresponding to the task requirement information from the slave system to the master system while waking up the master system.

11. A portable device, comprising:
a first system comprising a first hardware system and a first operation system running on the first hardware system;

a second system comprising a second hardware system and a second operation system running on the second hardware system;

a display being shared between the first and the second systems;

wherein the portable device further comprises:

an obtaining unit for obtaining a task requirement input by a user in a task input interface displayed on the display and generating task requirement information based on the task requirement input; and a scheduling management unit for determining, from the first system and the second system, an execution system for responding to a system task corresponding to the task requirement information based on a predetermined policy and transmitting the task requirement information to the execution system such that the execution system can execute the system task based on the task requirement information, wherein the execution system executes the system task in the background, while the interface displayed on the display remains to be unchanged whatever which one of the first and second systems are determined to be the execution system.

12. The portable device according to claim 11, wherein the scheduling management unit comprises:

a first scheduling management subunit for selecting, based on a slave-system-first policy, a slave system from the first system and the second system as the execution system for the system task corresponding to the task requirement information when both the first and the second systems are in an active state;

a second scheduling management subunit for waking up the slave system and determining the slave system as the execution system for the system task corresponding to the task requirement information when a master system of the first system and the second system is in an active state, the slave system is in an inactive state and it is determined based on the slave-system-first policy that the slave system is required to execute the system task; and a third scheduling management subunit for waking up the master system and determining the master system as the execution system for the system task corresponding to the task requirement information when the master system is in an inactive state, the slave system is in an active state and it is determined based on the slave-system-first policy that the master system is required to execute the system task;

wherein the first scheduling management subunit and the second scheduling management subunit are configured to select the master system as the execution system for the system task corresponding to the task requirement information if the slave system is not capable of executing the system task;

a fourth scheduling management subunit for determining, from the first system and the second system, a system capable of processing the system task corresponding to the task requirement information based on the task requirement information, determining, when the system capable of processing the system task corresponding to the task requirement information is in an active state, the system as the execution system for the system task corresponding to the task requirement information or waking up, when the system capable of processing the system task corresponding to the task requirement information is in an inactive state, the system and determining the system as the execution system for the system task corresponding to the task requirement information.

13. The portable device according to claim 11, wherein the obtaining unit and the scheduling management unit are provided in an Embedded Controller (EC) of the first hardware system or in a Micro Control Unit (MCU) of the second hardware system; or the obtaining unit and the scheduling management unit are provided in the first operation system or in the second operation system.

* * * * *